United States Patent

Boehm et al.

[11] Patent Number: 6,103,166
[45] Date of Patent: Aug. 15, 2000

[54] METHOD FOR IMPROVING ADHESION BETWEEN GOLF BALL LAYERS

[75] Inventors: Herbert C. Boehm, Norwell, Mass.; William E. Morgan, Barrington, R.I.; Jeffrey L. Dalton, North Dartmouth, Mass.; Dean A. Snell, Oceanside, Calif.; Christopher Cavallaro, Attleboro, Mass.

[73] Assignee: Acushnet Company, Fairhaven, Mass.

[21] Appl. No.: 09/005,906

[22] Filed: Jan. 12, 1998

[51] Int. Cl.⁷ .............................. B29C 45/14; B29C 45/16
[52] U.S. Cl. .................... 264/250; 264/274; 264/275; 264/279.1; 425/129.1; 425/542
[58] Field of Search ....................... 264/250, 255, 264/274, 279.1, 275; 425/542, 129.1; 473/368, 370, 371, 374

[56] References Cited

U.S. PATENT DOCUMENTS

| | | | |
|---|---|---|---|
| 697,925 | 4/1902 | Kempshall . | |
| 700,658 | 5/1902 | Kempshall | 473/374 |
| 704,748 | 7/1902 | Kempshall | 473/374 |
| 720,852 | 2/1903 | Smith, Jr. | 473/374 |
| 1,558,706 | 10/1925 | Mitzel . | |
| 2,229,170 | 1/1941 | Greene | 273/62 |
| 2,376,085 | 5/1945 | Radford et al. | 18/30 |
| 4,173,345 | 11/1979 | Pocklingrton | 273/217 |
| 4,229,401 | 10/1980 | Pocklington | 264/248 |
| 4,367,873 | 1/1983 | Chang et al. | 273/60 R |
| 5,692,973 | 12/1997 | Dalton | 473/374 |
| 5,836,834 | 11/1998 | Masutani et al. | 473/374 |

*Primary Examiner*—Jan H. Silbaugh
*Assistant Examiner*—Edmund H. Lee
*Attorney, Agent, or Firm*—Pennie & Edmonds LLP

[57] ABSTRACT

The present invention relates to methods for making golf balls having adhesion between adjacent layers. In particular, the golf balls of the present invention comprise a cover, a core and optionally one or more intermediate layers disposed between the cover and the core, wherein the outer surface of the core an intermediate layer(s) or both the core and the intermediate layer has a finely textured surface profile integrally molded in the outer surface thereof. The finely textured surface profile comprises a plurality of peaks having a plurality of heights with a maximum of said heights being between the range of about 2 mils to about 15 mils.

14 Claims, 3 Drawing Sheets

METHOD FOR IMPROVING ADHESION BETWEEN GOLF BALL LAYERS

FIELD OF INVENTION

The present invention is directed toward golf balls having improved adhesion between adjacent component layers, as well as to methods for forming such golf balls.

BACKGROUND OF THE INVENTION

Conventional golf balls can be divided into three general types or groups: (1) two piece balls, (2) wound balls (also known as three piece balls) and (3) multilayer balls. The difference in play characteristics resulting from these different types of constructions can be quite significant.

Balls having a two piece construction are generally most popular with the average recreational golfer because they are relatively durable while also providing maximum distance. Two piece balls are made with a single solid core, usually formed of a crosslinked rubber, which is encased by a cover material. Typically the solid core is composed of polybutadiene which is chemically crosslinked with zinc diacrylate and/or similar crosslinking agents and is covered by a cover material such as an ionomer resin (e.g., SURLYN® (DuPont) and Iotek® (Exxon)) or blends thereof, polyurethane or balata (transpolyisoprene rubber).

Wound balls typically have either a solid rubber or liquid center core around which many yards of a stretched elastic thread or yarn are wound. The wound core is then covered with a durable cover material such as an ionomer resin or a softer material such as balata or polyurethane. Wound balls are generally softer and provide more spin than two piece balls, which enables a skilled golfer to exercise greater control over the ball's flight and final position.

Relatively recently, a number of golf ball manufacturers have introduced multilayer golf balls in an effort to overcome some of the undesirable aspects of conventional two-piece balls such as their hard feel, while maintaining the positive attributes of these balls such as their increased initial velocity and distance. Further, it is desirable that such multilayer balls have a "click" and feel as well as spin characteristics approaching that of wound balls.

Multilayer golf balls can be formed using a variety of constructions. For example, multilayer balls may have two or more cover layers molded around a conventional core. Alternatively, they may comprise a conventional cover and a core with one or more intermediate layers interposed between the cover and the core. Likewise, multilayer balls may be formed from cores having more than one core layer and may optionally contain one or more intermediate and/or cover layers. Multilayer balls may even comprise a conventional wound core around which at least one intermediate layer and/or at least one cover layer is formed. Examples of multilayer balls that are presently commercially available include the Episode (Titleist), Altus Newing (Bridgestone), Giga (Spalding), Metal Mix (Dunlop) and Ultra Tour Balata (Wilson).

Typically, the layers of multilayer golf balls are formed by molding them around the core or a preceding intermediate layer or cover layer. Conventional techniques for applying such layers include injection molding, compression molding and casting the layer material around the preceding core or layer. Accordingly, a crucial aspect of the manufacture of multilayer balls is obtaining good adhesion between the various layers. If the adhesion between the layers does not meet desired standards, the performance of the golf ball will be adversely affected. For example, poor adhesion can cause air pockets between the layers which can result in separation of the layers when the ball is struck with a club.

It is well known that the adhesion between the wound core and the cover of a wound ball is enhanced due to the small imperfections created in the uneven outer surface of the winding formed by overlapping the thread. Cover material flows into these imperfections when the cover is molded about the wound core, resulting in improved adhesion. In contrast, however, in two piece and multilayer balls, adhesion between the core, cover and/or intermediate layers is greatly reduced due to the smooth outer surface of the layers.

Accordingly, there are a number of methods known in the art directed towards promoting adhesion between the various solid layers of a golf ball. For example, U.S. Pat. Nos. 4,229,401 and 4,173,345 are directed towards alleviating problems associated with compression molding covers about a core by providing a series of surface channels ⅟₁₆ of an inch deep which encircle the outer surface of the core and pass through both polar areas thereof. Providing such channels was found to prevent separation of the cover from the core when the ball is struck with a golf club by eliminating the entrapment of air between the cover and the core during the compression molding process.

Additionally, there are a number of patents directed towards promoting adhesion between core layers and covers, as well as adhesion between intermediate layers, including wound layers, through the use of projections or prongs extending from the outer surface of the core or an intermediate layer. For example, U.S. Pat. Nos. 720,852 and 2,229,170 disclose the use of a plurality of uniform sized projections extending from the surface of the core. Such projections are designed to provide an anchoring means for an elastic thread winding.

Moreover, U.S. Pat. No. 697,925 discloses game balls wherein a metallic core is covered by a soft rubber envelope which contains a plurality of deep "pits" extending about halfway through the envelope. A hard shell material is compression molded around the core/envelope such that the shell material flows into the pits, thereby forming prongs which interlock the hard shell with the soft rubber envelope.

Additionally, it is known in the golf ball art that adhesion between the cover and the core of a two-piece golf ball can be improved by roughening the outer surface of a core layer. For example, U.S. Pat. No. 1,558,706 provides a very general disclosure of improving the adhesion of a two piece ball having a vulcanized rubber core and a balata shell, wherein the outer surface of the core is roughened by forming corrugations which assist in interlocking the cover and the core so as to prevent any movement therebetween when the ball is struck with a club. Although the '706 patent discloses the general concept of roughening the core surface to improve adhesion, it does not provide any details as to how the core surface is roughened nor any specifics regarding the characteristics of the corrugations in the core surface.

Similarly, U.S. Pat. No. 4,367,873 discloses making a softball or a baseball having a PVC foam core and an ethylene copolymer core cover, wherein the core cover has corrugations one eighth to one sixteenth of an inch high. A layer of yarn windings is wound around the core cover and a leather outer cover is then placed around the windings. The '873 patent discloses that such corrugations may have a buffering effect when the ball is impacted and provide a more resilient ball as well as possibly increasing the binding friction between the outer leather cover and the inner core.

One conventional method for improving the adhesion between the layers of a multilayer golf ball is to texture the outer surface of, e.g., a core or a core with an intermediate layer(s) molded around it by manually roughening or scuffing the outer surface after molding and prior to forming the subsequent layer thereon. Such surface roughening is typically obtained by grinding the surface with a grinder such as a Glebar grinder or by tumbling or milling the ball at various stages of its construction in an abrasive media. Likewise, the surface may be roughened by blasting the surface of the layer with sand or some other abrasive material.

After the surface is roughened, it must be washed to remove any loose material or excess abrasive material. otherwise, the loose material and/or excess abrasive material which remains on the surface will form air pockets when the next layer is molded thereon. As mentioned above, such air pockets are undesirable as they lead to separation of the layers. Further, the roughened surface must be completely dried before the next layer can be applied. If it is not dried completely, the remaining moisture is converted into steam when the next layer is molded around it, forming defects in the interfacial bonding area that can also lead to separation of the layers.

Although such post-molding methods roughen the outer surface of the layer, it is difficult to obtain sufficient texture depths with these processes. Moreover, even after washing and drying the treated surface, there is a tendency for small particles from the golf ball layers and/or excess abrasive media to remain in the interfacial bonding area between the layers which are easily dislodged when the ball is struck with a club and can form air pockets between the layers which can lead to the separation of the layers. Similarly, inadequate texture depth can also lead to separation of the layers.

Further, such post-molding roughening methods require, at a minimum, three distinct steps: 1) roughening the surface via grinding; 2) washing the roughened surface to remove excess debris; and 3) thoroughly drying the roughened surface before the next layer can be applied. Each of these process steps are labor intensive, time-consuming and add additional expense to the production of multilayer golf balls.

Thus, there remains a need for an efficient method for improving the interfacial adhesion between golf ball layers, wherein the outer surface of a layer is provided with a texture of an adequate depth and free of debris, while eliminating any post-molding treatments such as grinding, sandblasting, washing and drying.

SUMMARY OF THE INVENTION

The present invention is directed towards a method for improving the interfacial adhesion between the layers of golf balls, and multilayer golf balls in particular, as well as golf balls made from such methods.

In particular, the present invention is directed to a method of forming a golf ball having improved interfacial adhesion between the layers forming the ball, wherein the ball comprises at least a cover and a core. The method comprises forming a finely textured pattern on the interior surface of a mold cavity for forming the core, said pattern comprising a plurality of depressions having a depth of about 2 to about 15 mils and a draft angle of less than about 10°. A core blend is introduced into the patterned cavity and a core is formed having a finely textured surface profile on its outermost surface which is the corresponding image of the pattern of the mold and comprises a plurality of peaks having a maximum height of about 2 to about 15 mils. A cover material is subsequently applied to the textured core.

In an alternate embodiment, the presently claimed method may further comprise forming one or more intermediate layers between the core and the cover, wherein the intermediate layer(s) also has a finely textured surface profile integrally formed in its outermost surface. Said intermediate layer is formed by placing the core into a second larger mold cavity, wherein the second cavity has a second finely textured pattern on the interior surface thereof, said pattern comprising a plurality of depressions having a depth of about 2 to about 15 mils and a draft angle of less than about 10°. The intermediate layer blend is introduced into the second cavity and an intermediate layer is formed about the core such that the intermediate layer is provided with a finely textured surface profile on its outermost surface which is a corresponding image of the pattern of the second mold cavity and comprises a plurality of peaks having a maximum height of about 2 to about 15 mils. A cover material is subsequently applied to the textured intermediate layer.

The present invention is also directed to a golf ball having at least a cover, a core and optionally one or more intermediate layers disposed between the cover and the core, wherein the core and/or at least one intermediate layer has a finely textured surface profile integrally formed on its outermost surface. The finely textured surface profile comprises a plurality of peaks having a maximum height of about 2 to about 15 mils. The finely textured surface profile may be a repeating pattern or it may be a random pattern of peaks. Such patterns may have peaks of a regular geometric shape or an irregular shape. Further, the surface of the core, the intermediate layer(s) or both may have a finely textured surface profile integrally formed thereon. When more than one layer has a finely textured surface profile, such surface profiles may comprise the same or different patterns.

Additionally, the present invention is further directed towards a mold for forming a golf ball wherein the mold comprises a cavity having a finely textured pattern on the interior surface thereof, said textured surface comprising a plurality of depressions having a depth of about 2 mils to about 15 mils and a draft angle of less than about 10°.

DETAILED DESCRIPTION OF THE INVENTION

Figure 1A:
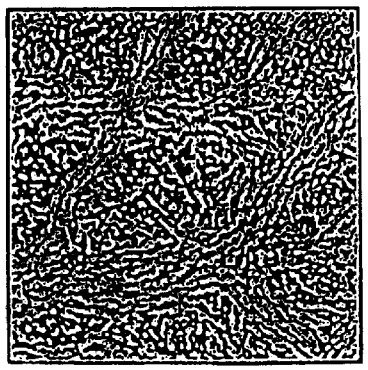
FIGS. 1A–1E illustrate several non-limiting examples of random finely textured surface profiles which are suitable for use in the present invention.
Figure 1B:
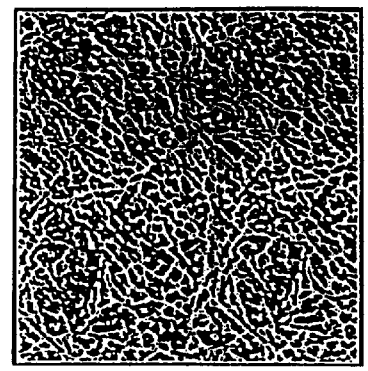
Figure 1C:
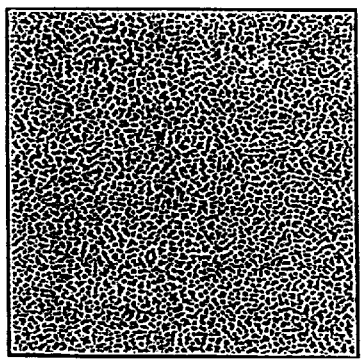
Figure 1D:
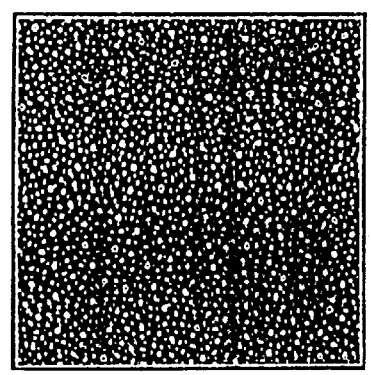
Figure 1E:
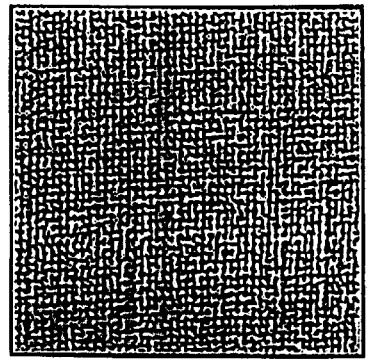
Figure 2A:
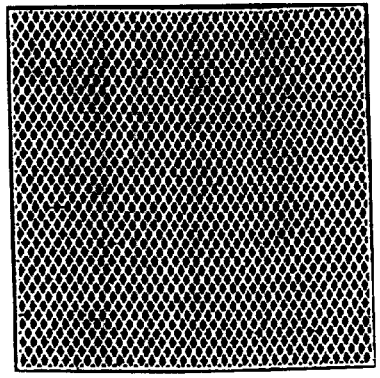
FIGS. 2A–2D illustrate non-limiting examples of uniform finely textured surface profiles which are suitable for use in the present invention.
Figure 2B:
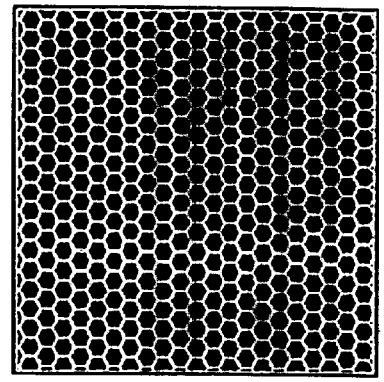
Figure 2C:
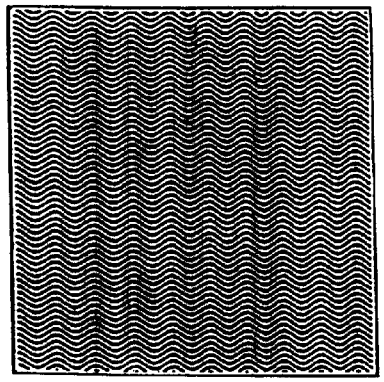
Figure 2D:
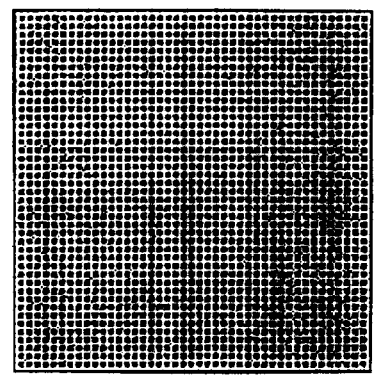

The present invention is directed toward a method and apparatus for forming golf balls having improved interfacial adhesion between their layers, as well as to golf balls made according to such methods. The methods of the present invention provide a streamlined, more efficient method for improving such interfacial adhesion as compared to presently known methods. More specifically, as discussed above, the prior art discloses several complicated methods for promoting adhesion of the various layers of a golf ball. Such methods include forming channels (1/16th of an inch or deeper) in the surface of an interior layer, forming deep pits extending halfway through the interior layer or forming an intricate series of protrusions in order to anchor preceding layers to an interior layer. Additionally, it is also known to roughen the surface of a golf ball core or interior layer by grinding or exposing its surface to an abrasive media. However, all of these methods require a number of labor intensive and time consuming steps and/or provide inferior adhesion as compared to the golf balls of the present invention.

The golf balls of the present invention comprise a cover and a core, and optionally at least one intermediate layer (e.g., a mantle layer, inner cover layer or outer core layer) interposed between the cover and the core, wherein the outer surface of either the core, an intermediate layer(s) or both, has a finely textured surface profile integrally formed thereon. When a golf ball of the present invention comprises more than one layer having a finely textured surface profile (e.g., a textured core and a textured intermediate layer), the surface profiles may comprise the same or different patterns.

The finely textured surface profiles employed in the present invention comprise a plurality of peaks integrally molded in the outermost surface of the core, the intermediate layer(s) or both. As used herein, the term "peaks" refers to the raised areas extending from the surface of the core and/or intermediate layer(s). Several parameters must be considered in selecting the appropriate surface profile to be formed on the outer surface of a golf ball layer. These parameters include peak height, its shape and the pattern density. It is preferable that these parameters be selected to maximize the surface area available for interfacial bonding between the textured surface profile and the layer subsequently applied.

The peaks of the finely textured surface profile have a maximum height of about 2 to about 15 mils, preferably about 2 to about 10 mils, more preferably about 3 to about 7 mils and most preferably about 4.5 mils. If the peaks have a maximum height of less than 2 mils, it has been found that the adhesion between the layers is not appreciably enhanced. Likewise, it has been found that if the height of the depressions is greater than 15 mils, it is very difficult to remove the core or intermediate layer from the mold cavity.

The peaks may have the same maximum height, or alternatively, a plurality of the peaks may have a height that is less than the maximum height. Further, the peaks may comprise a regular shape that extends to a single point such as a pyramid or a cone. Alternatively, the peaks may have an irregular or jagged shape which provides additional surface area for interfacial bonding with the subsequent layer. The peaks which form the surface profiles may all be substantially the same width or may comprise a wide range of widths.

As used herein "peak density" refers to the percentage (%) of the surface area of the outer surface of the layer which is covered by the peaks of the surface profile. For optimal results, it is preferred that the peak density be about 45 percent to about 75 percent, more preferably about 50 percent to about 70 percent and most preferably about 60 percent of the surface area of outer surface.

As illustrated by FIGS. 1A–1E and 2A–2D, the surface profiles employed in the present invention may comprise a wide variety of random or repeating patterns of peaks having various shapes. For example, as illustrated in FIGS. 2A–2D, the finely textured surface profile may comprise a repeating pattern of peaks having a regular shape such as a diamond, hexagon or square. Further, the finely textured surface profile may, in an alternate embodiment comprise a repeating pattern of peaks having an irregular shape. Still further, as illustrated in FIGS. 1A–1E, the finely textured surface profile may comprise a random pattern of non-uniformly shaped peaks.

Many of the finely textured surface profiles suitable for use in the present invention have previously been used in alternative (i.e., non-golf ball) applications as a decorative ornamental surface finish for a wide variety of plastic and metal commercial products such as housings for computers, photocopiers and electronic equipment, a variety of furniture, and various office products and accessories, to name but a few applications. However, in accordance with the present invention, it has now surprisingly been found that integrally molding such finely textured surface profiles on the outermost surface of cores and/or intermediate layer (s) of golf balls provides enhanced interfacial adhesion between the textured surface and the layer subsequently formed thereupon.

Since the finely textured patterns on the interior surface of the mold cavity correspond to the finely textured surface profiles to be integrally molded in to the outer surface of the golf ball construction, the desired features such as peak height, shape, and pattern density of the peaks of the surface profile must necessarily be considered when selecting a corresponding textured pattern for the interior surface of the mold.

Furthermore, an additional parameter to be considered in selecting a pattern for the surface of the mold cavity is the draft angle of the depressions formed in the mold. The term "draft angle" is well known in the molding art. It measures the angle at which the side wall of a depression varies from the perpendicular. If the draft angle is too small, the molded piece will not readily release from the mold. However, in the present invention, if the draft angle is too large, the resulting peaks formed in the surface of the golf ball layer will not provide sufficient interfacial adhesion.

Thus, in order to obtain sufficient interfacial adhesion as well as adequate release from the mold cavity, the draft angle of the depressions of the patterns formed in the mold must be less than about 10°, preferably about 2° to about 10°, more preferably about 4° to about 8° and most preferably about 6.5°.

The finely textured surface profile is formed in the outer surface of the core and/or intermediate layer by integrally molding such a profile into the outer surface during the molding process used in forming the core and/or intermediate layer. As mentioned above, the presently claimed method provides a more efficient and economical process for promoting surface adhesion over the methods presently known and employed in the art.

Figure 3A:
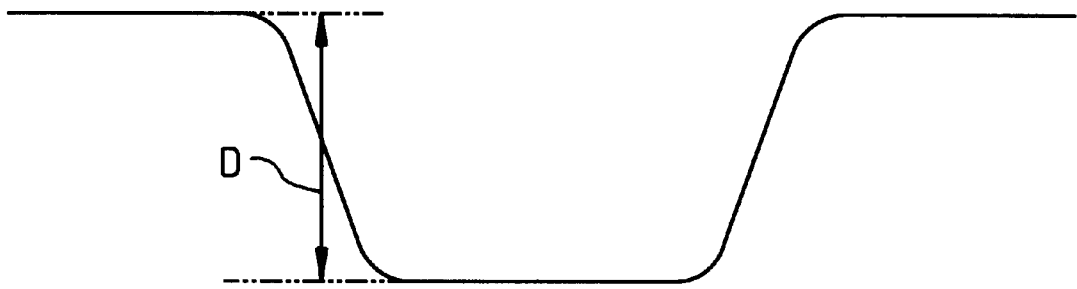
FIGS. 3A and 3B provide enlarged views of a single depression of the finely textured mold cavity patterns employed in the present invention.
Figure 3B:
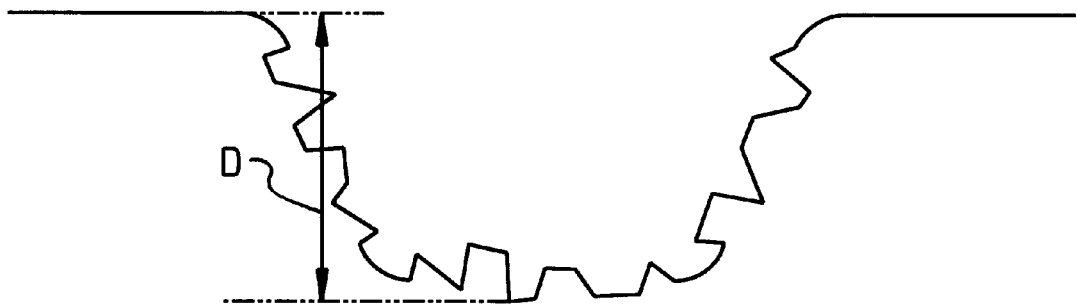

The finely textured surface profile is formed on the outer surface of the core and/or intermediate layer using a modified mold cavity. Typically, prior art mold cavities employed to form core layers and/or intermediate layers have a substantially smooth interior surface in order to facilitate the release of molded material from the cavity. However, the interior surface of the mold cavity used in the present invention, is adapted so as to have a finely textured pattern on its surface to produce a corresponding finely textured surface profile on the outer surface of the layered constructions formed therein. As illustrated in FIGS. 3A and 3B, the depressions of the finely textured patterns have a maximum depth D. The pattern comprises a plurality of depressions having a maximum depth of about 2 to about 15 mils, preferably about 2 to about 10 mils, more preferably about 3 to about 7 mils and most preferably about 4.5 mils.

As illustrated in FIG. 3A, the depressions of the finely textured patterns may have a regular shape and a substantially smooth bottom. However, as illustrated in FIG. 3B, the depressions of the finely textured patterns may also have an irregular shape with an uneven bottom so as to provide additional surface area for interfacial bonding with the layer that is subsequently applied.

The depressions which form the patterns may all be substantially the same width or may comprise a variety of different widths.

As used herein "depression density" refers to the percentage (%) of the surface area of the mold cavity's interior surface which is covered by the depressions of the finely textured pattern. For optimal results, it is preferred that the depression density be about 45 percent to about 75 percent, more preferably about 50 percent to about 70 percent and most preferably about 60 percent of the surface area of the interior surface of the mold cavity.

After the cavity has been adapted to contain a desired pattern, the core and/or intermediate layer forming material is introduced into the cavity using any known conventional molding methods such as injection or compression molding. The resulting construction (i.e., the core or a core with an intermediate layer molded thereon) contains a finely textured surface profile integrally molded on its outermost surface which is a "negative image" of the pattern of the interior surface of mold. This surface profile comprises a plurality of peaks having a height of about 2 to about 15 mils and a peak density of about 45 to about 75 percent. The construction is then removed from the mold and may proceed directly to the next manufacturing step without a need for any other surface preparation steps such as grinding, washing or drying.

A particularly preferred pattern is one commercially available from Mold-Tech (Division of Roehlen Industries) as Pattern No. 11050, which comprises a random pattern of non-uniform depressions having a depth of about 4.5 mils, a depression density of about 60 percent and a draft angle of about 6.5°.

The presently claimed method may be employed to improve the interfacial adhesion between any of the abutting layers of a golf ball construction. As such, the present method can be used to form conventional two-piece golf balls or multilayer golf balls comprising a cover, a core and at least one intermediate layer disposed between the cover and the core.

For example, a two-piece golf ball having a cover and a core may be formed by a compression molding process, wherein the core blend is introduced into a mold cavity having an interior surface that has been adapted to contain a finely textured pattern comprising a plurality of depressions having a depth of about 2 to 15 mils and a draft angle of less than about 10°. A core is formed having a corresponding finely textured surface profile comprising a plurality of peaks having a height of about 2 to 15 mils integrally formed in the outer surface thereof. The core is removed from the textured mold cavity, placed in a second mold cavity and subsequently a cover blend is applied around the textured core. The cover may be applied using any conventional technique such as injection molding, compression molding or casting methods. The finely textured surface profile of the core promotes adhesion between the core and the cover layer.

Further, a multilayer golf ball may also be formed by the present claimed method. The outer surface of each of the layers of the multilayer construction may have a finely textured surface profile comprising a plurality of peaks having a height of about 2 to 15 mils integrally molded therein. Each of the outer surfaces of the layers may have the same surface profile or different surface profiles. Alternatively, only selected layers of the construction may have a finely textured surface profile integrally molded therein.

In a non-limiting example, a golf ball core may be molded using a compression molding method. The core is then fixtured in a conventional mold cavity which contains a finely textured pattern on the interior surface of the cavity. An intermediate layer blend is subsequently introduced into the mold cavity to form an intermediate layer around the core wherein the outer surface of the intermediate layer contains a finely textured surface profile integrally molded therein. This construction is then directly placed into an additional mold cavity and a cover blend is injection molded around the construction to form a cover layer.

Alternatively, the cavity for forming the core may comprise a finely textured pattern on the interior surface thereof so as to form a core having a corresponding finely textured surface profile. The textured core is then placed in a second mold cavity which also has a finely textured interior surface. An intermediate material blend is then introduced to the second cavity to form a construction having an intermediate layer with a finely textured surface profile on the outer surface thereof. This construction is then directly placed into an additional mold cavity and a cover blend is injection molded around the construction to form a cover layer.

EXAMPLES

The following examples are provided for the purpose of illustration only. The examples should not be construed as limiting the present invention in any way as variations of the invention are possible which do not depart from the spirit and scope of the invention.

A golf ball of the present invention is formed comprising a cover, a core and an intermediate layer interposed between the cover and the core, wherein the intermediate layer has a finely textured pattern integrally formed in its outer surface. A core is formed by molding a core blend composition using conventional compression molding techniques. The core blend composition comprises:

| Ingredient | Parts Per Weight |
| --- | --- |
| Polybutadiene Rubber | 155.50 |
| Pigment | .10 |
| Varox 231 | .79 |
| EF(DBDB)60 | .29 |
| CaO | 36.00 |
| Zinc Diacrylate | 43.00 |
| SR 350 | 2.80 |
| Polywate 325 | 49.00 |

The core is ground using a Glebar grinder to provide the proper outer diameter. The ground core is then washed, dried and placed in a retractable pin injection mold cavity which has had its internal surface modified to provide a finely textured pattern thereon. In particular, the internal surface of the mold cavity is modified to have a pattern commercially available from Mold-Tech (Division of Roehlen Industries) as Pattern No. 11050, which comprises a random pattern of non-uniform depressions having a maximum depth of about 4.5 mils, a draft angle of about 6.5° and a depression density of about 60 percent.

A blend of a polyetherester copolymer (HYTREL® 3078) filled with 20% by weight ZnO which has a specific gravity of about 1.27 gms/cc is then injected into the mold cavity to form an intermediate layer. The golf ball construction comprising the core and the intermediate layer is removed from the mold halves. The outer surface of the intermediate layer has a finely textured surface profile integrally molded therein, said profile comprising a plurality of peaks having a maximum height of about 4.5 mils, and a peak density of about 60 percent.

The core/intermediate layer construction is then placed in a second injection mold cavity and a cover blend comprising approximately a 50/50 blend of SURLYN 7940 (Li) and SURLYN 8140 (Na) is molded around the construction using retractable pin injection molding techniques to form a cover. The cover subsequently undergoes conventional finishing techniques to provide a finished golf ball.

Although the present invention is described with reference to certain preferred embodiments, it is apparent that modifications and variations thereof may be made by those skilled in the art without departing from the scope of this invention as defined by the appended claims.

We claim:

1. A method of forming a golf ball having interfacial adhesion, said method comprising:
   (a) forming a first finely textured pattern on an interior surface of a mold cavity, wherein said first pattern comprises a plurality of depressions having depths, with all of said depths being between about 2 and 15 mils, and having a draft angle of less than about 10°;
   (b) introducing a core blend into said mold cavity having said first pattern;
   (c) forming a core having a finely textured surface profile integrally molded in the outer surface thereof, wherein said surface profile is a corresponding image of said pattern and comprises a plurality of peaks having heights, with all of said heights being between about 2 and 15 mils; and
   (d) applying a cover material to said textured core to form a cover surrounding said textured core such that the surface profile of said textured core promotes interfacial adhesion between the cover and said textured core.

2. The method of claim 1, wherein the draft angle ranges from about 4° to about 8°.

3. The method of claim 1, wherein said depressions having depths being between 3 mils and about 7 mils and wherein said peaks having heights being between 3 mils and about 7 mils.

4. The method of claim 1, wherein said pattern has a depression density of about 45 to about 75 percent and said surface profile has a peak density of about 45 to about 75 percent.

5. The method of claim 1, wherein said pattern comprises a random pattern of depressions having an irregular shape.

6. The method of claim 1 wherein said pattern comprises a repeating pattern of depressions having a regular shape.

7. The method of claim 1, which further comprises:
   (a) forming a second finely textured pattern on an interior surface of a second mold cavity, wherein said second pattern comprises a plurality of depressions having depths, with all of said depths being between 2 and about 15 mils, and having a draft angle of less than about 10°;
   (b) placing said textured core in said second mold cavity;
   (c) introducing an intermediate layer blend into said second cavity;
   (d) forming an intermediate layer on the surface of said textured core, said intermediate layer having a second finely textured surface profile integrally molded in the outer surface thereof, wherein said second surface profile is a corresponding image of said second pattern and comprises a plurality of peaks having heights with all of said heights being between about 2 and 15 mils and, wherein said surface profile of said textured core promotes interfacial adhesion between the textured core and the intermediate layer; and
   (e) applying said cover material to said textured intermediate layer to form said cover surrounding said intermediate layer such that the surface profile of said intermediate layer promotes interfacial adhesion between the cover and said intermediate layer.

8. The method of claim 7, wherein the first and second patterns are substantially the same.

9. The method of claim 7, wherein the draft angle of the first pattern and second pattern is about 4° to about 8°.

10. The method of claim 7, wherein the depressions of the first pattern and second pattern having depths being between 3 mils and about 7 mils and the peaks of the first surface profile and second surface profile having heights being between 3 mils and about 7 mils.

11. The method of claim 7, wherein the first pattern and second pattern have a depression density of about 45 to about 75 percent and the first surface profile and second surface profile have a peak density of about 45 to about 75 percent.

12. The method of claim 7, wherein said second pattern comprises a random pattern of depressions having an irregular shape.

13. The method of claim 7, wherein said second pattern comprises a repeating pattern of depressions having a regular shape.

14. A method of forming a multilayer golf ball comprising a cover, a core and at least one intermediate layer interposed between said cover and core, said multilayer ball having interfacial adhesion between the layers of the multilayer ball, wherein the method comprises:
   (a) forming a golf ball core;
   (b) forming a finely textured pattern on the interior surface of a mold cavity, wherein said pattern comprises a plurality of depressions having depths, with all of said depths being between about 2 and 15 mils, and having a draft angle of less than about 10°;
   (c) placing the core in said textured mold cavity;
   (d) introducing an intermediate layer blend into said textured mold cavity;
   (e) forming an intermediate layer on the surface of said core, said intermediate layer having a finely textured surface profile integrally molded in the outer surface thereof, wherein said surface profile is a corresponding image of said pattern and comprises a plurality of peaks having heights, with all of said heights being between about 2 and 15 mils; and
   (f) applying a cover material to said textured intermediate layer to form a cover surrounding said textured intermediate layer such that the surface profile of said textured intermediate layer promotes interfacial adhesion between the cover and said intermediate layer.

* * * * *